US008762015B2

(12) United States Patent
Takada et al.

(10) Patent No.: US 8,762,015 B2
(45) Date of Patent: Jun. 24, 2014

(54) AUTOMATIC SHIFT APPARATUS AND METHOD FOR DETERMINING TRANSMISSION ABNORMAL GEAR SPEED

(75) Inventors: Ryo Takada, Anjo (JP); Shoji Fushimi, Ichinomiya (JP); Tsunekazu Inakura, Anjo (JP); Masatoshi Taguchi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 14 days.

(21) Appl. No.: 13/415,095

(22) Filed: Mar. 8, 2012

(65) Prior Publication Data

US 2012/0253618 A1 Oct. 4, 2012

(30) Foreign Application Priority Data

Mar. 31, 2011 (JP) ................................. 2011-077272

(51) Int. Cl.
*F16H 59/70* (2006.01)
(52) U.S. Cl.
USPC ................................. 701/55; 477/906; 701/62
(58) Field of Classification Search
CPC ............ F16H 61/12; F16H 2061/1208; F16H 61/686; F16H 2061/1232; Y10S 477/906
USPC ................... 701/51, 55, 62; 477/906; 476/12; 475/158
See application file for complete search history.

(56) References Cited

U.S. PATENT DOCUMENTS

| | | | | |
|---|---|---|---|---|
| 4,393,732 A | * | 7/1983 | Suzuki et al. | 477/125 |
| 4,955,258 A | * | 9/1990 | Ito et al. | 477/115 |
| 7,513,850 B2 | * | 4/2009 | Yoneyama | 477/80 |
| 7,517,302 B2 | * | 4/2009 | Kobayashi et al. | 477/125 |
| 7,637,844 B2 | * | 12/2009 | Tasaka et al. | 477/107 |
| 7,682,275 B2 | * | 3/2010 | Yoneyama | 475/119 |
| 7,749,122 B2 | * | 7/2010 | Yoneyama | 475/116 |
| 7,862,472 B2 | * | 1/2011 | Kawaguchi et al. | 477/97 |
| 8,221,287 B2 | * | 7/2012 | Oshima et al. | 477/111 |
| 2007/0135986 A1 | * | 6/2007 | Kawamura et al. | 701/62 |
| 2007/0283779 A1 | * | 12/2007 | Hiroi et al. | 74/473.1 |

(Continued)

FOREIGN PATENT DOCUMENTS

| | | | | |
|---|---|---|---|---|
| JP | A-01-172038 | | 7/1989 | |
| JP | A-01-172663 | | 7/1989 | |
| JP | A-07-083327 | | 3/1995 | |
| JP | 2010-180967 | * | 2/2009 | ............. F16H 61/12 |
| JP | A-2009-150457 | | 7/2009 | |

OTHER PUBLICATIONS

May 22, 2012 Search Report issued in PCT/JP2012/054916 (with English translation).

*Primary Examiner* — Fadey Jabr
*Assistant Examiner* — Courtney Heinle
(74) *Attorney, Agent, or Firm* — Oliff PLC (57) ABSTRACT

An automatic shift apparatus including a transmission; a vehicle speed acquisition unit; a gear speed acquisition unit that acquires a gear speed of the transmission; a unit that sets, based on a vehicle speed, a minimum allowable gear speed at which a rotation speed of an input shaft of the transmission is equal to or lower than a predetermined rotation speed and which has a highest gear ratio among a plurality of gear speeds; and a unit that determines that the gear speed is abnormal if the gear speed has a higher gear ratio than the minimum allowable gear speed due to a change in the gear speed, and not determining that the gear speed is abnormal if the gear speed has a higher gear ratio than the minimum allowable gear speed due to a change in the minimum allowable gear speed that is set.

4 Claims, 7 Drawing Sheets

(56) References Cited

U.S. PATENT DOCUMENTS

| | | | |
|---|---|---|---|
| 2008/0183359 A1* | 7/2008 | Sawada | 701/54 |
| 2009/0164075 A1* | 6/2009 | Ogasawara | 701/54 |
| 2009/0292431 A1* | 11/2009 | Hoshino et al. | 701/62 |
| 2010/0056335 A1* | 3/2010 | Ferrier et al. | 477/168 |
| 2011/0320095 A1* | 12/2011 | Anderson et al. | 701/54 |

* cited by examiner

|  | | C-1 | C-2 | C-3 | B-1 | B-2 | F-1 |
|---|---|---|---|---|---|---|---|
| P | | | | | | | |
| REV | | | | ○ | | ○ | |
| N | | | | | | | |
| D | 1st | ○ | | | | ● | ○ |
| | 2nd | ○ | | | ○ | | |
| | 3rd | ○ | | ○ | | | |
| | 4th | ○ | ○ | | | | |
| | 5th | | ○ | ○ | | | |
| | 6th | | ○ | | ○ | | |

○: ENGAGED, ●: ENGAGED DURING ENGINE BRAKING

AUTOMATIC SHIFT APPARATUS AND METHOD FOR DETERMINING TRANSMISSION ABNORMAL GEAR SPEED

INCORPORATION BY REFERENCE

The disclosure of Japanese Patent Application No. 2011-077272 filed on Mar. 31, 2011 including the specification, drawings and abstract is incorporated herein by reference in its entirety.

BACKGROUND OF THE INVENTION

The present invention relates to an automatic shift apparatus and a method for determining a transmission abnormal gear speed.

DESCRIPTION OF THE RELATED ART

As this type of automatic shift apparatus, in the past, an automatic shift apparatus has been proposed that has an automatic shift mode in which a transmission is shifted depending on the running state, and a manual shift mode in which the transmission is shifted based on a manual operation. Even if the manual shift mode is selected, shifting from first to second speed is performed when the vehicle stops or decelerates due to a braking operation, and shifting to a predetermined intermediate to high speed is performed if a low gear speed such as the first or second speed is instructed at a high vehicle speed (e.g., see Japanese Patent Application Publication No. 7-83327 (JP 7-83327 A)). Such a control in this apparatus prevents stalling of an engine connected to an input shaft of the transmission in the former case, and prevents over-revolution of the engine in the latter case.

SUMMARY OF THE INVENTION

In such an automatic shift apparatus, the gear speed of the transmission is compared with a minimum gear speed at which the rotation speed of the input shaft of the transmission is equal to or less than (does not exceed) a predetermined rotation speed. The gear speed of the transmission could be determined as abnormal if the gear speed of the transmission is a gear speed (lower speed) having a higher gear ratio than the minimum gear speed. However, depending on the running state of the automobile, the gear speed may become a gear speed having a higher gear ratio than the minimum gear speed even though this gear speed is actually not abnormal. In such case, a simple comparison between the gear speed of the transmission and the minimum gear speed may result in an erroneous determination of an abnormal gear speed.

An automatic shift apparatus and a method for determining a transmission abnormal gear speed according to the present invention suppresses an erroneous determination of an abnormal gear speed of a transmission.

The automatic shift apparatus and the method for determining a transmission abnormal gear speed according to the present invention adopt the following to achieve the above.

An automatic shift apparatus according to the present invention is to be mounted on a vehicle, and includes a transmission that forms a plurality of gear speeds by engaging different combinations of two of a plurality of friction engagement elements. The automatic shift apparatus further includes: a vehicle speed acquisition unit that acquires a vehicle speed; a gear speed acquisition unit that acquires the gear speed of the transmission; a minimum allowable gear speed setting unit that sets, based on the acquired vehicle speed, a minimum allowable gear speed as the gear speed at which a rotation speed of an input shaft of the transmission is equal to or lower than a predetermined rotation speed and which has a highest gear ratio among the plurality of gear speeds; and an abnormality determination unit that determines that the gear speed is abnormal if the gear speed acquired by the gear speed acquisition unit becomes a gear speed having a higher gear ratio than the minimum allowable gear speed set by the minimum allowable gear speed setting unit due to a change in the gear speed of the transmission, and not determining that the gear speed is abnormal if the gear speed acquired by the gear speed acquisition unit becomes a gear speed having a higher gear ratio than the minimum allowable gear speed set by the minimum allowable gear speed setting unit due to a change in the minimum allowable gear speed set by the minimum allowable gear speed setting unit.

In the automatic shift apparatus of the present invention, the minimum allowable gear speed is set, based on the acquired vehicle speed, as the gear speed at which the rotation speed of the input shaft of the transmission is equal to or lower than the predetermined rotation speed and which has the highest gear ratio among the plurality of gear speeds. It is determined that the gear speed is abnormal if the gear speed becomes the gear speed having a higher gear ratio than the minimum allowable gear speed due to the change in the gear speed of the transmission. It is not determined that the gear speed is abnormal if the gear speed becomes the gear speed having a higher gear ratio than the minimum allowable gear speed due to the change in the minimum allowable gear speed. That is, if the gear speed of the transmission becomes the gear speed (lower speed) having a higher gear ratio than the minimum allowable gear speed, whether the gear speed of the transmission is abnormal is determined based on a factor that caused the gear speed of the transmission to become the gear speed (lower speed) having a higher gear ratio than the minimum allowable gear speed. This can suppress an erroneous determination of an abnormal gear speed of the transmission more than when the gear speed of the transmission is determined to be abnormal based only on the fact that the gear speed of the transmission has become the gear speed having a higher gear ratio than the minimum allowable gear speed.

In the automatic shift apparatus of the present invention described above, the abnormality determination unit may determine that the gear speed is abnormal if the acquired gear speed becomes a gear speed having a higher gear ratio than the set minimum allowable gear speed, due to the change in the set minimum allowable gear speed, and the rotation speed of the input shaft of the transmission becomes higher than a second predetermined rotation speed determined as a rotation speed higher than the predetermined rotation speed. This allows the abnormal gear speed of the transmission to be more reliably detected.

Also, in the automatic shift apparatus of the present invention, the gear speed acquisition unit may acquire one of the gear speed that is estimated as a currently established gear speed based on a current value to be applied to each of a plurality of solenoid valves in an actuator that supplies and discharges hydraulic fluid to and from the plurality of friction engagement elements, the gear speed that is estimated as the currently established gear speed based on a ratio of the rotation speed of the input shaft of the transmission to a rotation speed of an output shaft of the transmission, and the gear speed that is set as a gear speed to be established based on the vehicle speed.

A method for determining a transmission abnormal gear speed according to the present invention is a method for determining a transmission abnormal gear speed in an automatic shift apparatus that is to be mounted on a vehicle and includes a transmission that forms a plurality of gear speeds by engaging different combinations of two of a plurality of friction engagement elements. The method includes: setting, based on a vehicle speed, a minimum allowable gear speed as the gear speed at which a rotation speed of an input shaft of the transmission is equal to or lower than a predetermined rotation speed and which has a highest gear ratio among the plurality of gear speeds; and determining that the gear speed is abnormal if the gear speed is the gear speed having a higher gear ratio than the set minimum allowable gear speed due to a change in the gear speed of the transmission, and not determining that the gear speed is abnormal if the gear speed is the gear speed having a higher gear ratio than the set minimum allowable gear speed due to a change in the set minimum allowable gear speed.

In the method for determining a transmission abnormal gear speed according to the present invention, the minimum allowable gear speed is set, based on the vehicle speed, as the gear speed at which the rotation speed of the input shaft of the transmission is equal to or lower than the predetermined rotation speed and which has the highest gear ratio among the plurality of gear speeds. It is determined that the gear speed is abnormal if the gear speed becomes the gear speed having a higher gear ratio than the minimum allowable gear speed due to the change in the gear speed of the transmission. It is not determined that the gear speed is abnormal if the gear speed becomes the gear speed having a higher gear ratio than the minimum allowable gear speed due to the change in the minimum allowable gear speed. That is, if the gear speed of the transmission becomes the gear speed (lower speed) having a higher gear ratio than the minimum allowable gear speed, whether the gear speed of the transmission is abnormal is determined based on a factor that caused the gear speed of the transmission to become the gear speed (lower speed) having a higher gear ratio than the minimum allowable gear speed. This can suppress an erroneous determination of an abnormal gear speed of the transmission more than when the gear speed of the transmission is determined to be abnormal based only on the fact that the gear speed of the transmission has become the gear speed having a higher gear ratio than the minimum allowable gear speed.

DETAILED DESCRIPTION OF THE EMBODIMENT

An embodiment of the present invention will be described below.

Figure 1:
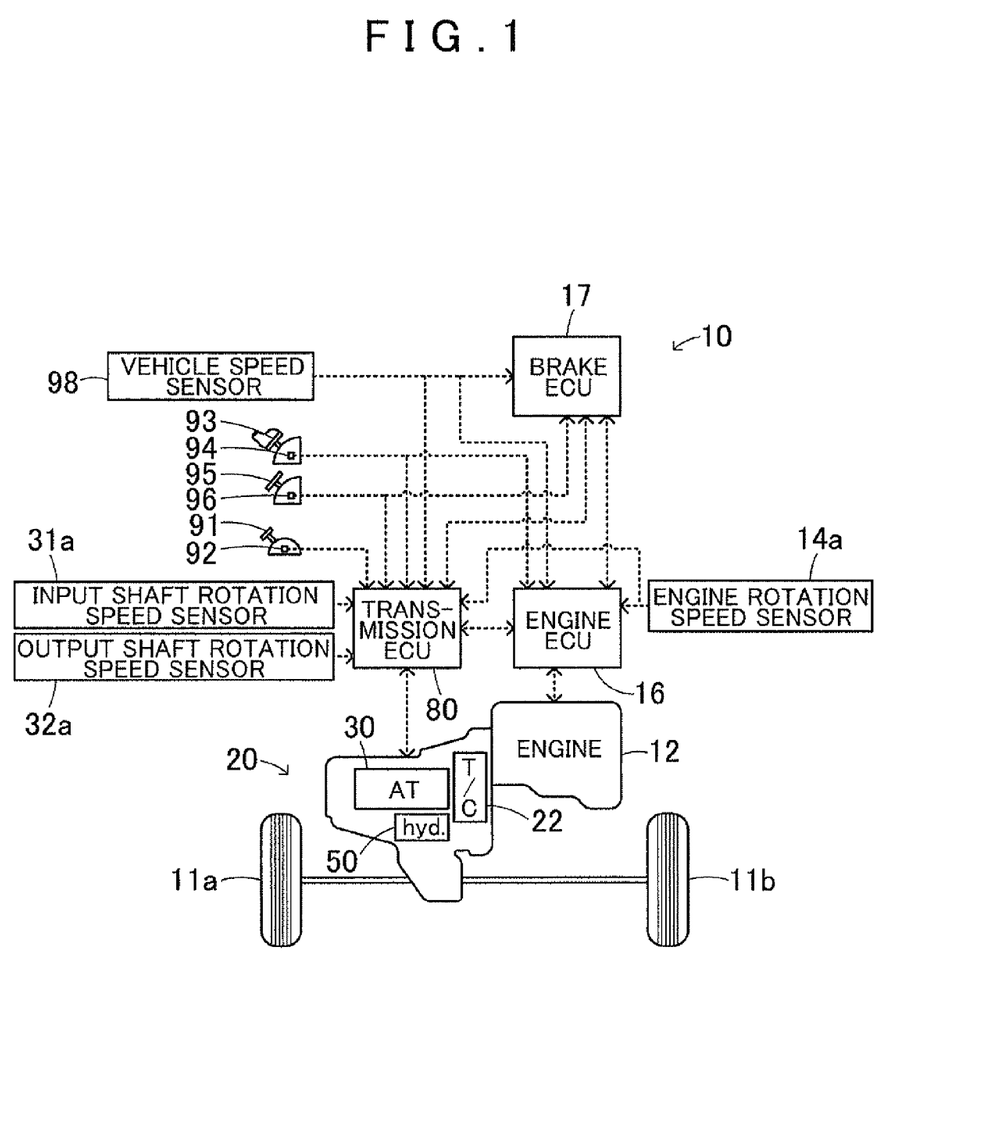
FIG. 1 is a configuration diagram that schematically shows the configuration of an automobile 10 to which an automatic shift apparatus 20 according to an embodiment of the present invention is mounted.
Figure 2:
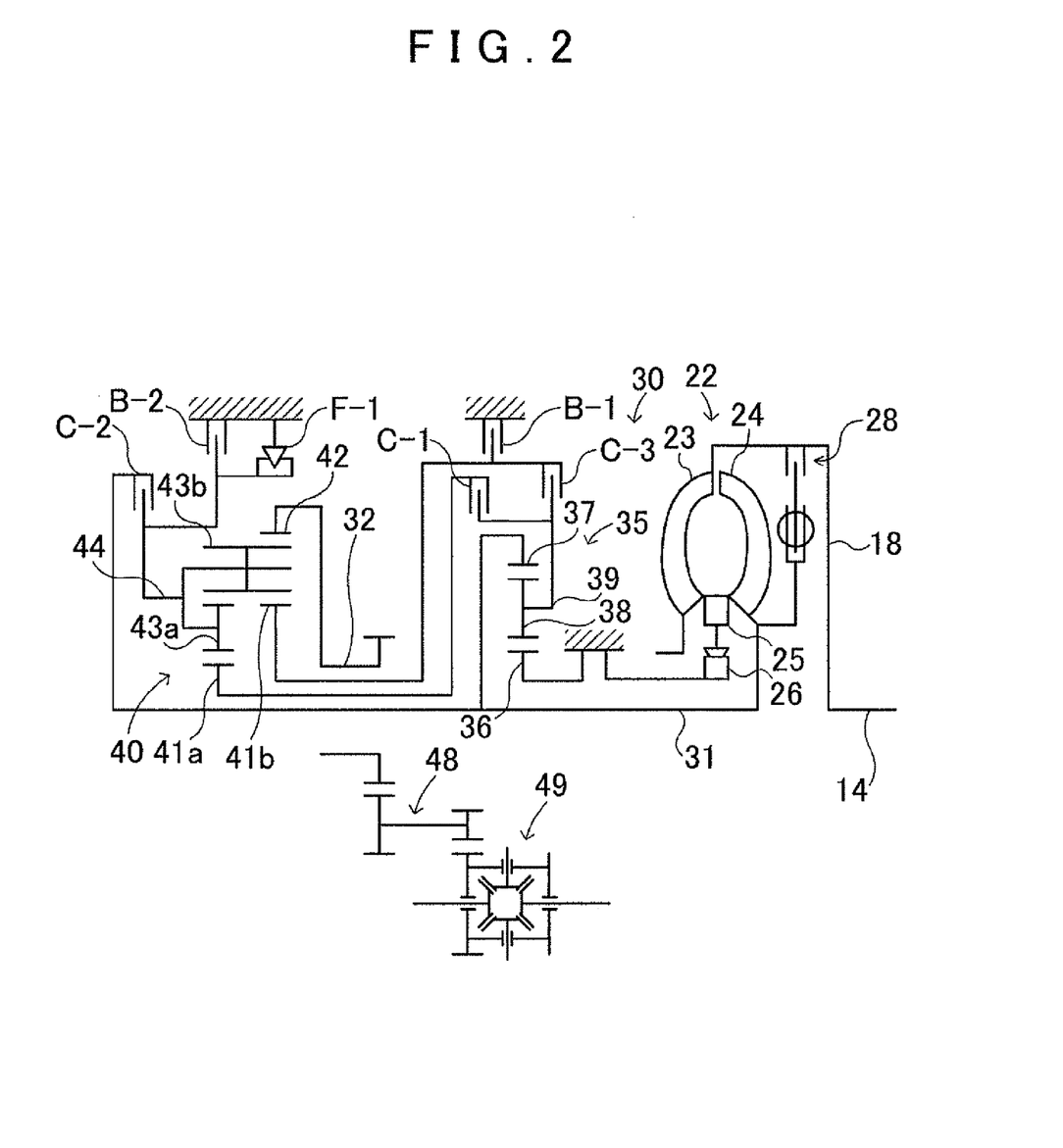
FIG. 2 is a configuration diagram that schematically shows the mechanical configuration of the automatic shift apparatus 20.

FIG. 1 is a configuration diagram that schematically shows the configuration of an automobile 10 to which an automatic shift apparatus 20 according to the embodiment of the present invention is mounted. FIG. 2 is a configuration diagram that schematically shows the mechanical configuration of the automatic shift apparatus 20. As shown in FIGS. 1 and 2, the automobile 10 of the embodiment includes: an engine 12 as an internal combustion engine that outputs power by the explosive combustion of a hydrocarbon fuel such as gasoline or light oil; an engine electronic control unit (hereinafter referred to as an "engine ECU") 16 that operates and controls the engine 12; a fluid power transmission device 22 attached to a crankshaft 14 of the engine 12; a stepped automatic transmission 30 that has an input shaft 31 connected to the output side of the fluid power transmission device 22 and an output shaft 32 connected to driving wheels 11a, 11b via a gear mechanism 48 and a differential gear 49, wherein the stepped automatic transmission 30 changes the speed of power input to the input shaft 31 and transmits the power changed in speed to the output shaft 32; a hydraulic circuit 50 that supplies hydraulic oil to the fluid power transmission device 22 and the automatic transmission 30; a transmission electronic control unit (hereinafter referred to as a "transmission ECU") 80 that controls the fluid power transmission device 22 and the automatic transmission 30 by controlling the hydraulic circuit 50; and a brake electronic control unit (hereinafter referred to as a "brake ECU") 17 that controls an electronically-controlled hydraulic brake unit (not shown). The automatic shift apparatus 20 of the embodiment mainly corresponds to the automatic transmission 30, the hydraulic circuit 50, and the transmission ECU 80.

The engine ECU 16 is configured as a microprocessor having a CPU as a main component. In addition to the CPU, the engine ECU 16 includes: a ROM that stores processing programs; a RAM that temporarily stores data; input and output ports; and a communication port. The engine ECU 16 is input via the input port with signals from various sensors that detect the operation state of the engine 12 such as an engine rotation speed Ne from a rotation speed sensor 14a attached to the crankshaft 14, and signals such as an accelerator operation amount Ace from an accelerator pedal position sensor 94 that detects the accelerator operation amount Acc as an amount by which an accelerator pedal 93 is depressed and a vehicle speed V from a vehicle speed sensor 98. The engine ECU 16 outputs via the output port signals such as a drive signal to be applied to a throttle motor to drive a throttle valve, a control signal to be applied to a fuel injection valve, and an ignition signal to be applied to an ignition plug.

As shown in FIG. 2, the fluid power transmission device 22 is configured as a hydraulic torque converter having a lockup clutch. The fluid power transmission device 22 includes: a pump impeller 23 as an input-side fluid power transmission element connected to the crankshaft 14 of the engine 12 via a front cover 18; a turbine runner 24 as an output-side fluid power transmission element connected to the input shaft 31 of the automatic transmission 30 via a turbine hub; a stator 25 that is disposed inward of the pump impeller 23 and the turbine runner 24 and rectifies the hydraulic oil flow from the turbine runner 24 to the pump impeller 23; a one-way clutch 26 that limits the rotation direction of the stator 25 to one direction; and a lockup clutch 28 that has a damper mechanism. This fluid power transmission device 22 functions as a torque amplifier by the function of the stator 25 when there is a large difference in rotation speed between the pump impeller 23 and the turbine runner 24, and functions as a fluid coupling when there is a small difference in rotation speed between the pump impeller 23 and the turbine runner 24. The lockup clutch 28 is capable of locking up the pump impeller 23 (the front cover 18) and the turbine runner 24 (the turbine hub) to couple them, and canceling the locked-up state. If a lockup-on condition is satisfied after the automobile 10 starts off, the lockup clutch 28 locks up the pump impeller 23 and the turbine runner 24 so that the power from the engine 12 is mechanically and directly transmitted to the input shaft 31. Note that fluctuations in the torque transmitted to the input shaft 31 at such time are absorbed by the damper mechanism.

Figure 3:
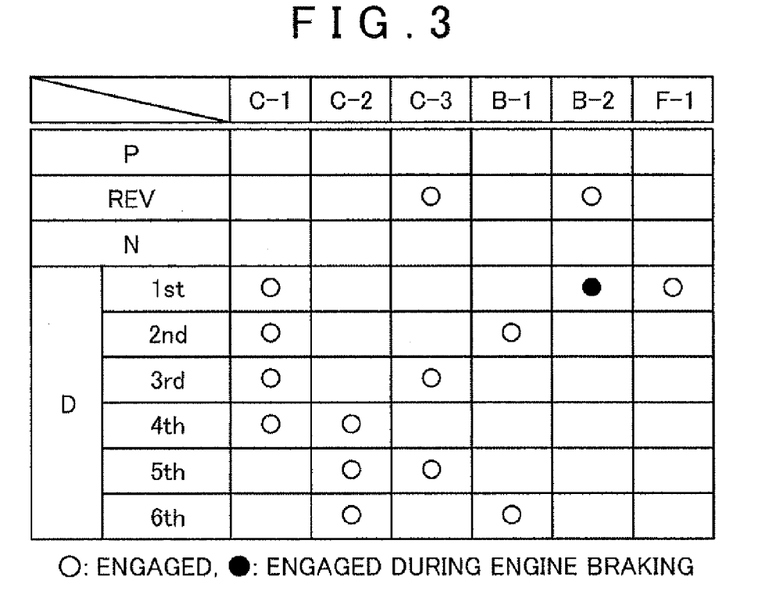
FIG. 3 is an explanatory diagram that shows an operation chart representing the relationships between each gear speed of an automatic transmission 30 and the operation states of clutches C-1 to C-3 and brakes B-1, B-2.
Figure 4:
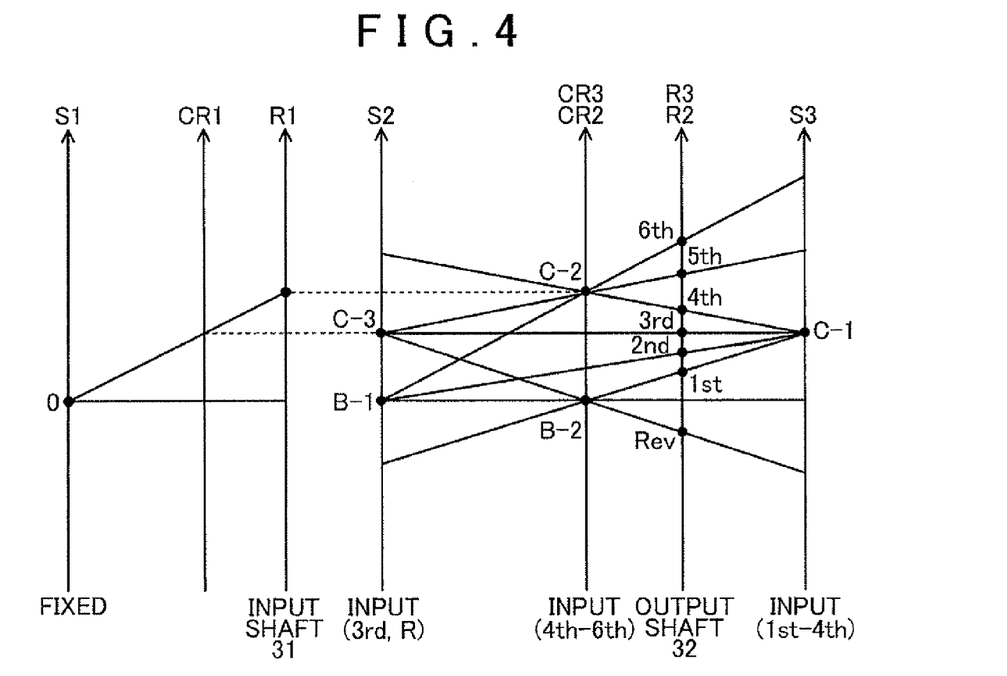
FIG. 4 is an explanatory diagram that shows an alignment chart illustrating the rotation speed relationships among rotating elements forming the automatic transmission 30.

The automatic transmission 30 is configured as a six-speed stepped transmission. The automatic transmission 30 includes: a single-pinion type planetary gear mechanism 35; a Ravigneaux type planetary gear mechanism 40; three clutches C-1, C-2, C-3; two brakes B-1, B-2; and a one-way clutch F-1. The single-pinion type planetary gear mechanism 35 includes: a sun gear 36 as an external gear; a ring gear 37 as an internal gear disposed on a concentric circle with the sun gear 36; a plurality of pinion gears 38 meshing with the sun gear 36 and also meshing with the ring gear 37; and a carrier 39 that rotatably and revolvably holds the plurality of pinion gears 38. The sun gear 36 is fixed to a case, and the ring gear 37 is connected to the input shaft 31. The Ravigneaux type planetary gear mechanism 40 includes: two sun gears 41a, 41b as external gears; a ring gear 42 as an internal gear; a plurality of short pinion gears 43a meshing with the sun gear 41a; a plurality of long pinion gears 43b meshing with the sun gear 41b and the plurality of short pinion gears 43a, and also meshing with the ring gear 42; and a carrier 44 that couples the plurality of short pinion gears 43a with the plurality of long pinion gears 43b, and rotatably and revolvably holds the plurality of short pinion gears 43a and the plurality of long pinion gears 43b. The sun gear 41a is connected to the carrier 39 of the single-pinion type planetary gear mechanism 35 via the clutch C-1. The sun gear 41b is connected to the carrier 39 via the clutch C-3, and connected to the case via the brake B-1. The ring gear 42 is connected to the output shaft 32, and the carrier 44 is connected to the input shaft 31 via the clutch C-2. The carrier 44 is connected to the case via the brake B-2, and connected to the case via the one-way clutch F-1. FIG. 3 shows an operation chart representing the relationships between each gear speed of the automatic transmission 30 and the operation states of the clutches C-1 to C-3 and the brakes B-1, B-2. FIG. 4 shows an alignment chart that illustrates the rotation speed relationships among rotating elements forming the automatic transmission 30. As shown by the operation chart of FIG. 3, the automatic transmission 30 can switch among first to sixth forward speeds, reverse, and neutral based on a combination of on/off states (where on corresponds to an engaged state, and off corresponds to a disengaged state) of the clutches C-1 to C-3 and the brakes B-1, B-2.

Figure 5:
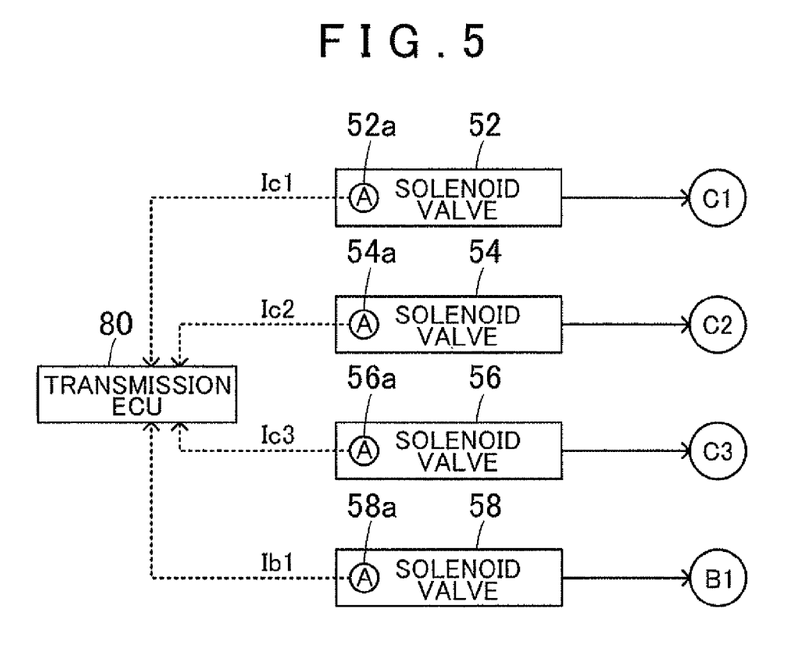
FIG. 5 is an explanatory diagram that shows an example of the relationship between the clutches C-1 to C-3 and the brake B-1 and linear solenoid valves 52 to 58.

The fluid power transmission device 22 and the automatic transmission 30 are operated by the hydraulic circuit 50 that is driven and controlled by the transmission ECU 80. The hydraulic circuit 50 includes: an oil pump that pressure-feeds the hydraulic oil using the power from the engine 12; a primary regulator valve that regulates the pressure of the hydraulic oil from the oil pump to generate a line pressure PL; a secondary regulator valve that reduces the line pressure PL from the primary regulator valve to generate a secondary pressure Psec; a modulator valve that regulates the line pressure PL from the primary regulator valve to generate a constant modulator pressure Pmod; a manual valve that switches a supply destination (among the clutches C-1 to C-3 and the brakes B-1, B-2) to supply the line pressure PL from the primary regulator valve according to the operation position of a shift lever 91; and a plurality of normally closed linear solenoid valves 52 to 58 that regulates the line pressure PL from the manual valve according to a current applied from an auxiliary battery (not shown) to generate a solenoid pressure to be applied to the corresponding clutch C-1 to C-3 or brake B-1, B-2. FIG. 5 is an explanatory diagram that shows an example of the relationship between the clutches C-1 to C-3 and the brake B-1 and the linear solenoid valves 52 to 58. Note that, in the embodiment, the brake B-2 is supplied with the hydraulic oil from the solenoid valve 56 corresponding to the clutch C-3 via a switch valve (not shown) during engine braking at the first forward speed, and supplied with the hydraulic oil from the manual valve when the operation position of the shift lever 91 is at a reverse position (R position). That is, in the embodiment, the hydraulic circuit 50 has no dedicated linear solenoid valve for the brake B-2.

The transmission ECU 80 is configured as a microprocessor having a CPU as a main component. In addition to the CPU, the transmission ECU 80 includes: a ROM that stores processing programs; a RAM that temporarily stores data; input and output ports; and a communication port. The transmission ECU 80 is input via the input port with signals from various sensors that detect the operation state of the engine 12 such as the engine rotation speed Ne from the rotation speed sensor 14a attached to the crankshaft 14, and signals such as an input shaft rotation speed Nin from a rotation speed sensor 31a attached to the input shaft 31, an output shaft rotation speed Nout from a rotation speed sensor 32a attached to the output shaft 32, currents Ic1 to Ib1 from current sensors 52a to 58a that detect currents applied to the respective solenoid valves 52 to 58, a shift position SP from a shift position sensor 92 that detects the position of the shift lever 91, the accelerator operation amount Acc from the accelerator pedal position sensor 94, a brake pedal position BP from a brake pedal position sensor 96 that detects the amount by which a brake pedal 95 is depressed, and the vehicle speed V from the vehicle speed sensor 98. The transmission ECU 80 outputs via the output port signals such as a control signal to be applied to the hydraulic circuit 50.

Note that the engine ECU 16, the brake ECU 17, and the transmission ECU 80 are connected to each other via the communication ports, and transmit and receive various control signals and data required for control to and from each other. In the embodiment, a park position (P position) that is used for parking, a reverse position (R position) for reverse travel, and a neutral position (N position) for neutral, and a normal drive position (D position) for forward travel are prepared as the shift position SP of the shift lever 91.

Figure 6:
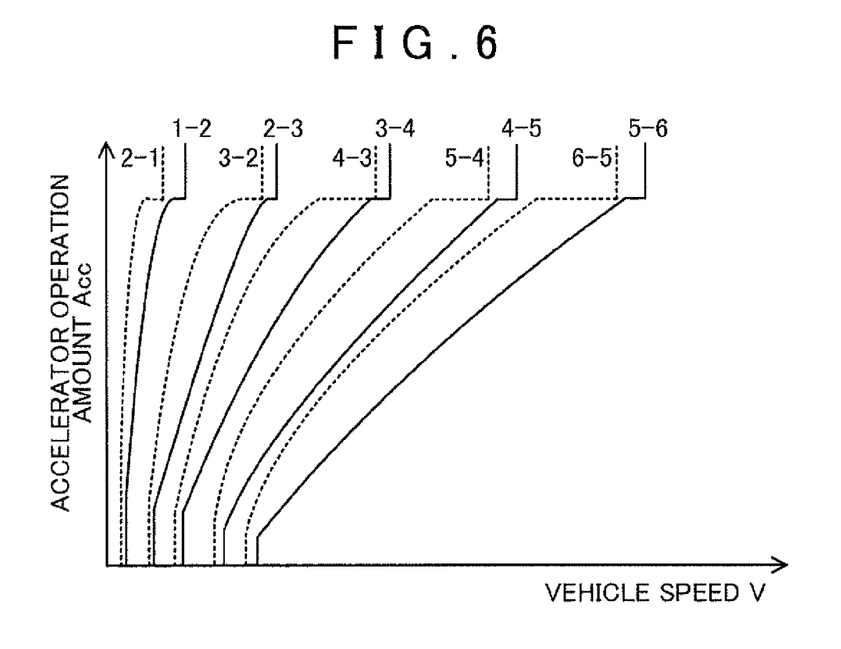
FIG. 6 is an explanatory diagram that shows an example of a shift map.

In the automatic shift apparatus 20 of the embodiment thus configured, the transmission ECU 80 sets a target gear speed GS* based on the accelerator operation amount Acc from the accelerator pedal position sensor 94, the vehicle speed V from the vehicle speed sensor 98, and a shift map of FIG. 6, and controls the hydraulic circuit 50 so that the set target gear speed GS* is established in the automatic transmission 30, that is, the clutches C-1 to C-3 and the brakes B-1, B-2 corresponding to the target gear speed GS* are engaged and the other clutches and brakes are disengaged. Specifically, as shown in the shift map of FIG. 6, when an operation point determined by the accelerator operation amount Acc and the vehicle speed V crosses a 1-2 upshift line, a 2-3 upshift line, a 3-4 upshift line, a 4-5 upshift line, or a 5-6 upshift line from left to right at a gear speed equal to or lower than the gear speed indicated by the numerals to the left of the upshift line (e.g., the first or second gear speed in the case of the 2-3 upshift line), the clutches C-1 to C-3 and the brakes B-1, B-2 are engaged or disengaged so that the gear speed is upshifted from this current gear speed to the gear speed indicated by the numeral to the right of the upshift line (e.g., the third gear speed in the case of the 2-3 upshift line). When the operation point determined by the accelerator operation amount Acc and the vehicle speed V crosses a 6-5 downshift line, a 5-4 downshift line, a 4-3 downshift line, a 3-2 downshift line, or a 2-1 downshift line from right to left at a gear speed equal to or higher than the gear speed indicated by the numerals to the left of the downshift line (e.g., one of the fourth to sixth gear speeds in the case of the 4-3 downshift line), the clutches C-1 to C-3 and the brakes B-1, B-2 are engaged or disengaged so that the gear speed is downshifted from this current gear speed to the gear speed indicated by the numeral to the right of the downshift line (e.g., the third gear speed in the case of the 4-3 downshift line).

Figure 7:
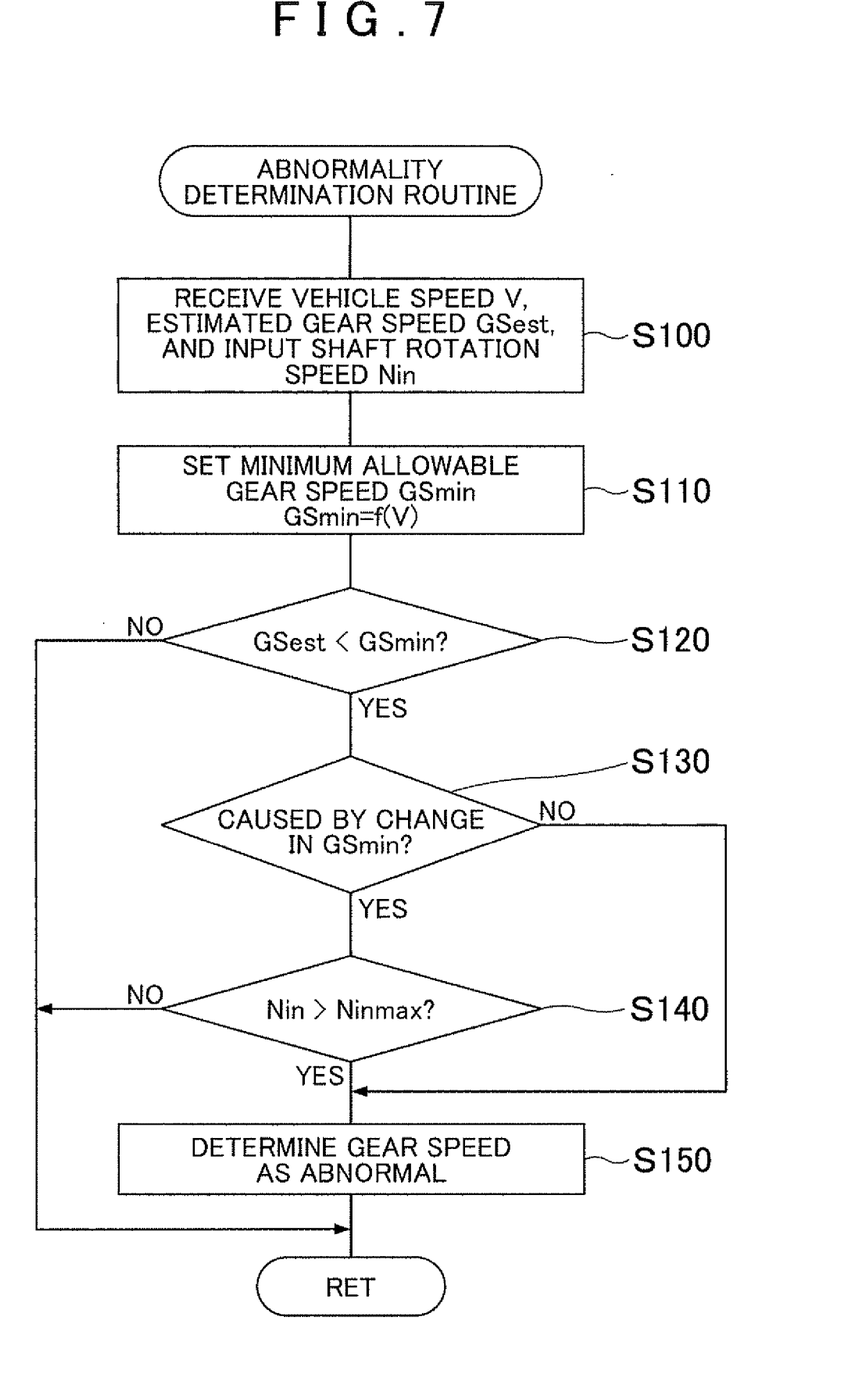
FIG. 7 is a flowchart that shows an example of an abnormality determination routine executed by a transmission ECU 80.

Next, the operation of the automatic shift apparatus 20 of the embodiment, in particular, the operation performed to determine whether the gear speed of the automatic transmission 30 of the automatic shift apparatus 20 is abnormal will be described below. FIG. 7 is a flowchart that shows an example of an abnormality determination routine executed by the transmission ECU 80. This routine is repeatedly executed at a predetermined time interval (e.g., every several milliseconds or every several tens of milliseconds).

When executing the abnormality determination routine, first, the transmission ECU 80 performs a process to receive data such as the input shaft rotation speed Nin from the rotation speed sensor 31a, the vehicle speed V from the vehicle speed sensor 98, and an estimated gear speed GSest estimated as the gear speed of the automatic transmission 30 (step S100). Here, the estimated gear speed GSest that is input to the transmission ECU 80 is a currently established gear speed that is estimated by specifying those of the clutches C-1 to C-3 and the brakes B-1, B-2 that are engaged, based on the shift position SP from the shift position sensor 92, a signal from the engine ECU 16 indicating whether engine braking is being performed, the currents Ic1 to Ib1 from the current sensors 52a to 58a, and the like.

Figure 8:
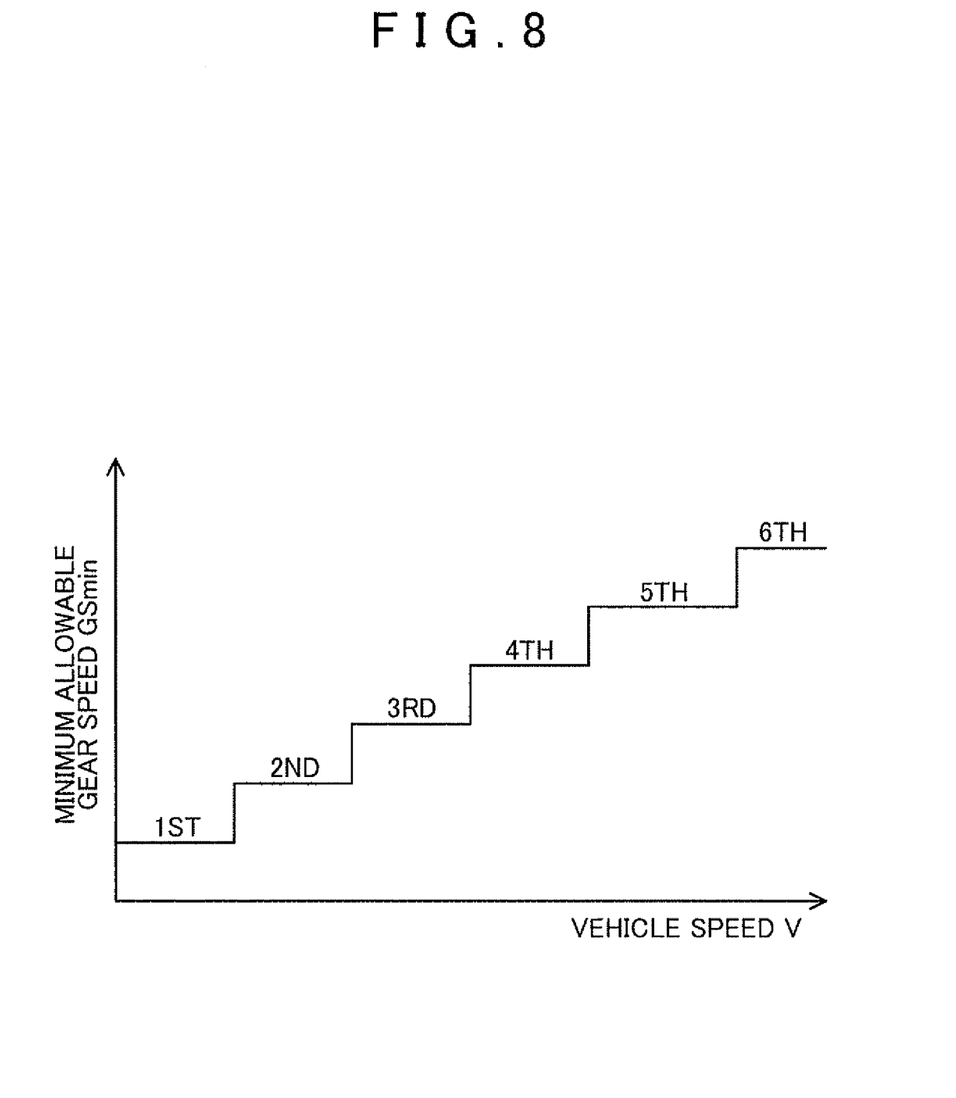
FIG. 8 is an explanatory diagram that shows an example of a map for setting a minimum allowable gear speed.

After thus receiving the data, the transmission ECU 80 sets a minimum allowable gear speed GSmin as a gear speed having the highest gear ratio out of the gear speeds at which the input shaft rotation speed Nin is equal to or lower than a predetermined rotation speed Ninref that is slightly lower than an upper-limit rotation speed Ninmax (step S110). In the embodiment, the relationship between the vehicle speed V and the minimum allowable gear speed GSmin is acquired in advance through tests, analyses, and so forth, and pre-stored in the ROM (not shown) of the transmission ECU 80 as a map for setting the minimum allowable gear speed. When the transmission ECU 80 receives the vehicle speed V, the transmission ECU 80 calculates and sets a corresponding minimum allowable gear speed GSmin from the stored map. FIG. 8 shows an example of the map for setting the minimum allowable gear speed. As evident from FIG. 8, as the vehicle speed V increases, a gear speed (higher speed) having a lower gear ratio (rotation speed of input shaft 31/rotation speed of output shaft 32) is set as the minimum allowable gear speed GSmin. Note that the shift map of FIG. 6 described above is determined so that a gear speed having a gear ratio equal to or lower than the minimum allowable gear speed GSmin is set as the target gear speed GS*. The upper-limit rotation speed Ninmax is determined as the upper limit of an allowable range of the input shaft rotation speed NM, based on the specifications of the engine 12 connected to the input shaft 31 of the automatic transmission 30 via the fluid power transmission device 22. For example, the upper-limit rotation speed Ninmax may be 5,000 rpm or 6,000 rpm. Moreover, the predetermined rotation speed Ninref may be a rotation speed that is lower than the upper-limit rotation speed Ninmax by approximately several tens to several hundreds of revolutions per minute.

Next, the transmission ECU 80 compares the received estimated gear speed GSest with the minimum allowable gear speed GSmin (step S120). If the estimated gear speed GSest is equal to or higher than the minimum allowable gear speed GSmin (a gear speed (higher speed) having a gear ratio equal to or lower than the minimum allowable gear speed GSmin), the transmission ECU 80 terminates the routine.

If the estimated gear speed GSest is lower than the minimum allowable gear speed GSmin (a gear speed (lower speed) having a higher gear ratio than the minimum allowable gear speed GSmin), the transmission ECU 80 determines that the gear speed may be abnormal, and examines a factor that caused the estimated gear speed GSest to become lower than the minimum allowable gear speed GSmin (step S130). If the factor is a change in the estimated gear speed GSest, the transmission ECU 80 determines that the gear speed of the automatic transmission 30 is abnormal (step S150), and terminates the routine. Thus, an abnormal gear speed of the automatic transmission 30 can be detected, for example, if the clutches C-1, C-3 are engaged and the third gear speed is established due to some abnormality, even though the minimum allowable gear speed GSmin is the fourth gear speed, the target gear speed GS* is the fifth gear speed, and thus the clutches C-2, C-3 should be engaged (maintained in an engaged state). Note that the estimated gear speed GSest can become lower than the minimum allowable gear speed GSmin due to a change in the estimated gear speed GSest, e.g., when the transmission ECU 80 abnormally performs a calculation or abnormally outputs a command value, when the hydraulic circuit 50 abnormally operates, or when the current sensors 52a to 58a abnormally detect. In the embodiment, if it is determined that the gear speed of the automatic transmission 30 is abnormal, processes are performed as necessary, such as lighting a warning lamp (not shown) of the automobile 10, providing a warning such as a warning sound or voice, shifting to a gear speed (higher speed) having a lower gear ratio, and disengaging the clutches C-1 to C-3 and the brakes B-1, B-2.

If the factor that caused the estimated gear speed GSest to become lower than the minimum allowable gear speed GSmin is not a change in the estimated gear speed GSest but a change in the minimum allowable gear speed GSmin, the transmission ECU 80 compares the input shaft rotation speed Nin with the upper-limit rotation speed Ninmax described above (step S140). If the input shaft rotation speed Nin is equal to or lower than the upper-limit rotation speed Ninmax, the transmission ECU 80 does not determine that the gear speed of the automatic transmission 30 is abnormal, and terminates the routine. If the input shaft rotation speed Nin is higher than the upper-limit rotation speed Ninmax, the transmission ECU 80 determines that the gear speed of the automatic transmission 30 is abnormal (step S150), and terminates the routine. That is, if the factor that caused the estimated gear speed GSest to become lower than the minimum allowable gear speed GSmin is a change in the minimum allowable gear speed GSmin, the transmission ECU 80 determines whether the gear speed of the automatic transmission 30 is abnormal depending on the input shaft rotation speed Nin. For example, it may be assumed that the vehicle speed sensor 98 calculates the vehicle speed V based on the driving wheel speed of the driving wheels 11a, 11b of the automobile 10, and the automatic shift apparatus 20 does not upshift the automatic transmission 30 upon slipping caused by idle rotation of the driving wheels 11a, 11b in order to suppress over-rotation of the gear mechanism 48 and the differential gear 49. In such case, when the vehicle speed V from the vehicle speed sensor 98 increases due to slipping caused by idle rotation of the driving wheels 11a, 11b, the estimated gear speed GSest is not switched in some cases even though the minimum allowable gear speed GSmin is switched to a gear speed (higher speed) having a lower gear ratio, such as from the third to the fourth gear speed. In such cases, the estimated gear speed GSest has not been changed, and it cannot be said that there is an abnormality in the automatic shift apparatus 20. Accordingly, it is preferable to not determine that the gear speed of the automatic transmission 30 is abnormal. In the embodiment, the gear speed of the automatic transmission 30 is not determined to be abnormal based only on the fact that the estimated gear speed GSest has become lower than the minimum allowable gear speed GSmin. This can suppress an erroneous determination of an abnormal gear speed of the automatic transmission 30 more than when the gear speed of the automatic transmission 30 is determined to be abnormal based only on the fact that the estimated gear speed GSest has become lower than the minimum allowable gear speed GSmin. Moreover, in the embodiment, if the input shaft rotation speed Nin thereafter exceeds the upper-limit rotation speed Ninmax, it is determined that the gear speed of the automatic transmission 30 is abnormal. This allows the abnormal gear speed of the automatic transmission 30 to be more reliably detected. In the embodiment, processes such as shifting to a gear speed (higher speed) having a lower gear ratio and disengaging the clutches C-1 to C-3 and the brakes B-1, B-2 are performed if the input shaft rotation speed Nin exceeds the upper-limit rotation speed Ninmax and it is determined that the gear speed of the automatic transmission 30 is abnormal. This can suppress over-rotation of the input shaft 31 of the automatic transmission 30, and the engine 12 connected to the input shaft 31 via the fluid power transmission device 22.

Figure 9:
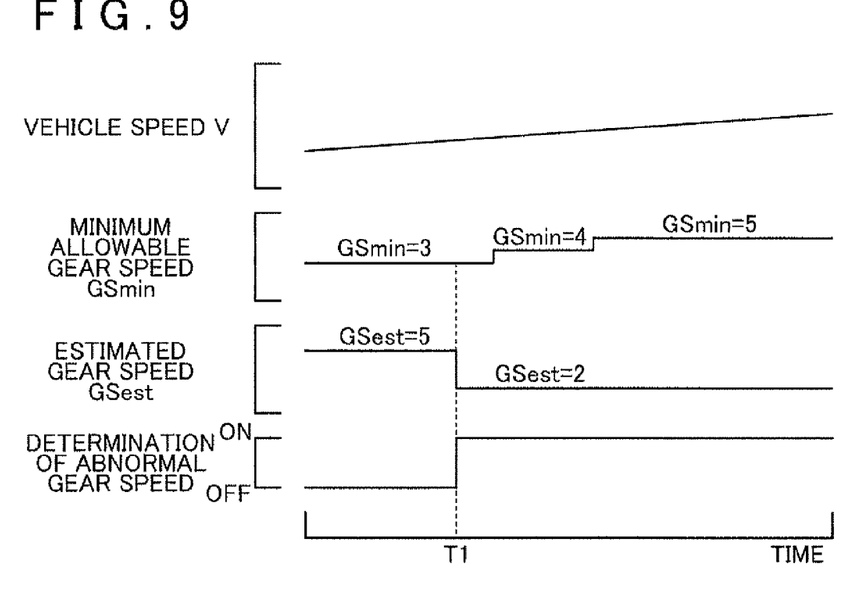
FIG. 9 is an explanatory diagram that shows an example of how a vehicle speed V, a minimum allowable gear speed GSmin, an estimated gear speed GSest, and the determination of an abnormal gear speed change over time when the estimated gear speed GSest becomes lower than the minimum allowable gear speed GSmin due to a change in the estimated gear speed GSest.
Figure 10:
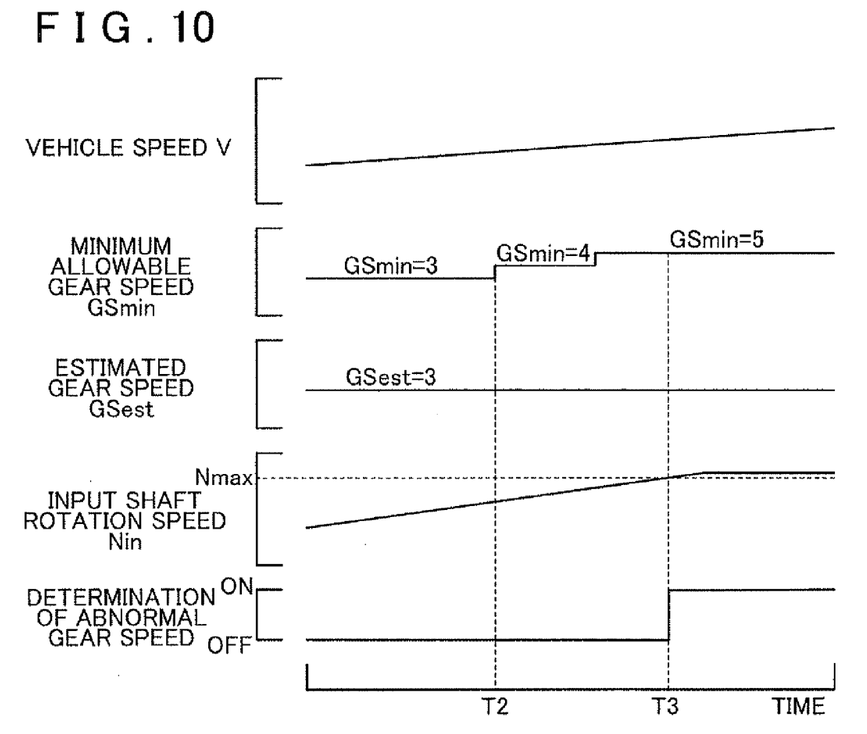
FIG. 10 is an explanatory diagram that shows an example of how the vehicle speed V, the minimum allowable gear speed GSmin, the estimated gear speed GSest, an input shaft rotation speed Nin, and the determination of an abnormal gear speed change over time when the estimated gear speed GSest becomes lower than the minimum allowable gear speed GSmin due to a change in the minimum allowable gear speed GSmin.

FIG. 9 is an explanatory diagram that shows an example of how the vehicle speed V, the minimum allowable gear speed GSmin, the estimated gear speed GSest, and the determination of an abnormal gear speed change over time when the estimated gear speed GSest becomes lower than the minimum allowable gear speed GSmin due to a change in the estimated gear speed GSest. FIG. 10 is an explanatory diagram that shows an example of how the vehicle speed V, the minimum allowable gear speed GSmin, the estimated gear speed GSest, the input shaft rotation speed Nin, and the determination of an abnormal gear speed change over time when the estimated gear speed GSest becomes lower than the minimum allowable gear speed GSmin due to a change in the minimum allowable gear speed GSmin. In the example of FIG. 9, it is determined that the gear speed of the automatic transmission 30 is abnormal when the estimated gear speed GSest becomes lower than the minimum allowable gear speed GSmin due to a change in the estimated gear speed GSest (a time T1). Meanwhile, in the example of FIG. 10, it is not determined that the gear speed of the automatic transmission 30 is abnormal when the estimated gear speed GSest becomes lower than the minimum allowable gear speed GSmin due to a change in the minimum allowable gear speed GSmin (a time T2), but it is thereafter determined that the gear speed of the automatic transmission 30 is abnormal when the input shaft rotation speed Nin exceeds the upper-limit rotation speed Ninmax in such a state (a time T3). By thus determining whether the gear speed of the automatic transmission 30 is abnormal depending on the factor that causes the estimated gear speed GSest to become lower than the minimum allowable gear speed GSmin, the determination can be more suitably made.

According to the automatic shift apparatus 20 of the embodiment described above, when the estimated gear speed GSest is lower than the minimum allowable gear speed GSmin, it is determined that the gear speed of the automatic transmission 30 is abnormal if the factor that caused the estimated gear speed GSest to become lower than the minimum allowable gear speed GSmin is a change in the estimated gear speed GSest. However, if the factor is a change in the minimum allowable gear speed GSmin, the determination that the gear speed of the automatic transmission 30 is abnormal is not made based only on the fact that the estimated gear speed GSest has become lower than the minimum allowable gear speed GSmin. This can suppress an erroneous determination of an abnormal gear speed of the automatic transmission 30 more than when the gear speed of the automatic transmission 30 is determined to be abnormal regardless of other conditions when the target gear speed GS* or the estimated gear speed GSest has become lower than the minimum allowable gear speed GSmin. Moreover, if the factor that caused the estimated gear speed GSest to become lower than the minimum allowable gear speed GSmin is a change in the minimum allowable gear speed GSmin, it is determined that the gear speed of the automatic transmission 30 is abnormal when the input shaft rotation speed Nin exceeds the upper-limit rotation speed Ninmax. Therefore, an abnormal gear speed of the automatic transmission 30 can be more reliably determined. By taking appropriate action thereafter, over-rotation of the input shaft 31 of the automatic transmission 30, and the engine 12 connected to the input shaft 31 via the fluid power transmission device 22 can be suppressed.

In the automatic shift apparatus 20 of the embodiment, the estimated gear speed GSest is acquired by estimating a currently established gear speed by specifying those of the clutches C-1 to C-3 and the brakes B-1, B-2 that are engaged, based on the shift position SP from the shift position sensor 92, the signal from the engine ECU 16 indicating whether engine braking is being performed, the currents Ic1 to Ib1 from the current sensors 52a to 58a, and the like. However, the present invention is not limited to this example. As another example, the gear speed may be estimated based on a ratio (Nin/Nout) of the input shaft rotation speed NM as a rotation speed of the input shaft 31 of the automatic transmission 30 to the output shaft rotation speed Nout as a rotation speed of the output shaft 32.

In the automatic shift apparatus 20 of the embodiment, when the estimated gear speed GSest becomes lower than the minimum allowable gear speed GSmin, whether the gear speed of the automatic transmission 30 is abnormal is determined depending on the factor that caused the estimated gear speed GSest to become lower than the minimum allowable gear speed GSmin. However, the target gear speed GS* described above may be used instead of or in addition to the estimated gear speed GSest. In such case, the target gear speed GS* can become lower than the minimum allowable gear speed GSmin due to a change in the target gear speed GS* when the transmission ECU 80 abnormally performs a calculation, for example.

In the automatic shift apparatus 20 of the embodiment, when the estimated gear speed GSest becomes lower than the minimum allowable gear speed GSmin due to a change in the minimum allowable gear speed GSmin, whether the gear speed of the automatic transmission 30 is abnormal is determined based on a comparison between the input shaft rotation speed Nin from the rotation speed sensor 31a and the upper-limit rotation speed Ninmax. Alternatively, whether the gear speed of the automatic transmission 30 is abnormal may be determined based on a comparison between the engine rotation speed Ne from the rotation speed sensor 14a and an engine-side upper-limit rotation speed Nemax as a rotation speed of the engine 12 corresponding to the upper-limit rotation speed Ninmax.

Although the six-speed automatic transmission 30 is used in the automatic shift apparatus 20 of the embodiment, an automatic transmission with three speeds, four speeds, or five speeds may be used, or an automatic transmission with seven speeds or eight speeds (or more) may be used.

In the embodiment, the present invention is applied to the form of the automatic shift apparatus 20. However, the present invention may be in the form of a method for controlling a transmission.

The correspondence between the main elements of the embodiment and the main elements of the invention described in the Disclosure of the Invention will be described below. In the embodiment, the automatic transmission 30 corresponds to a "transmission." The vehicle speed sensor 98 or the transmission ECU 80 that performs the processing at step S100 of the abnormality determination routine in FIG. 7 to receive the vehicle speed V from the vehicle speed sensor 98 corresponds to a "vehicle speed acquisition unit." The transmission ECU 80 that performs the processing at step S110 of the abnormality determination routine in FIG. 7 to receive the estimated gear speed GSest that is estimated based on the shift position SP from the shift position sensor 92, the signal from the engine ECU 16 indicating whether engine braking is being performed, the currents Ic1 to Ib1 from the current sensors 52a to 58a, and the like corresponds to a "gear speed acquisition unit." The transmission ECU 80 that performs the processing at step S110 in the abnormality determination routine in FIG. 7 to set, as the vehicle speed V from the vehicle speed sensor 98 increases, a gear speed (higher speed) having a lower gear ratio as the minimum allowable gear speed GSmin corresponds to a "minimum allowable gear speed setting unit." The transmission ECU 80 that performs the processing at steps S120 to S150 in the abnormality determination routine of FIG. 7 to determine that the gear speed of the automatic transmission 30 is abnormal if the estimated gear speed GSest is lower than the minimum allowable gear speed GSmin and the factor that caused the estimated gear speed GSest to become lower than the minimum allowable gear speed GSmin is a change in the estimated gear speed GSest, and not determine that the gear speed of the automatic transmission 30 is abnormal based only on the fact that the estimated gear speed GSest has become lower than the minimum allowable gear speed GSmin if the factor is a change in the minimum allowable gear speed GSmin corresponds to an "abnormality determination unit."

Note that the correspondence between the main elements of the embodiment and the main elements of the invention described in the Disclosure of the Invention is shown by way of example only in order to specifically describe a mode for carrying out the invention described in the Disclosure of the Invention. This correspondence is not intended to limit the elements of the invention described in the Disclosure of the Invention. That is, the invention described in the Disclosure of the Invention should be construed based on the description in the Disclosure of the Invention, and the embodiment is shown merely as a specific example of the invention described in the Disclosure of the Invention.

Although a mode for carrying out the invention is described based on an embodiment, the present invention is not limited in any manner to the embodiment and may be carried out in various forms without departing from the sprit and scope of the present invention.

The present invention may be used in the manufacturing industry of an automatic shift apparatus, and the like.

What is claimed is:

1. An automatic shift apparatus that is to be mounted on a vehicle, comprising:
   a transmission that forms a plurality of gear speeds by engaging different combinations of two of a plurality of friction engagement elements;
   a vehicle speed acquisition unit that acquires a vehicle speed;
   a gear speed acquisition unit that acquires the gear speed of the transmission;
   a minimum allowable gear speed setting unit that sets, based on the acquired vehicle speed, a minimum allowable gear speed as the gear speed at which a rotation speed of an input shaft of the transmission is equal to or lower than a predetermined rotation speed and which has a highest gear ratio among the plurality of gear speeds; and
   an abnormality determination unit that determines that the gear speed is abnormal responsive to the gear speed acquired by the gear speed acquisition unit becoming a gear speed having a higher gear ratio than the minimum allowable gear speed set by the minimum allowable gear speed setting unit due to a change in the gear speed of the transmission, and not determining that the gear speed is abnormal responsive to the gear speed acquired by the gear speed acquisition unit becoming a gear speed having a higher gear ratio than the minimum allowable gear speed set by the minimum allowable gear speed setting unit due to a change in the minimum allowable gear speed set by the minimum allowable gear speed setting unit, wherein
   the abnormality determination unit determines that the gear speed is abnormal responsive to the acquired gear speed becoming a gear speed having a higher gear ratio than the set minimum allowable gear speed, due to the change in the set minimum allowable gear speed, and the rotation speed of the input shaft of the transmission becoming higher than a second predetermined rotation speed determined as a rotation speed higher than the predetermined rotation speed.

2. The automatic shift apparatus according to claim 1, wherein the gear speed acquisition unit acquires one of the gear speed that is estimated as a currently established gear speed based on a current value to be applied to each of a plurality of solenoid valves in an actuator that supplies and discharges hydraulic fluid to and from the plurality of friction engagement elements, the gear speed that is estimated as the currently established gear speed based on a ratio of the rotation speed of the input shaft of the transmission to a rotation speed of an output shaft of the transmission, and the gear speed that is set as a gear speed to be established based on the vehicle speed.

3. The automatic shift apparatus according to claim 1, wherein the gear speed acquisition unit acquires one of the gear speed that is estimated as a currently established gear speed based on a current value to be applied to each of a plurality of solenoid valves in an actuator that supplies and discharges hydraulic fluid to and from the plurality of friction engagement elements, the gear speed that is estimated as the currently established gear speed based on a ratio of the rotation speed of the input shaft of the transmission to a rotation speed of an output shaft of the transmission, and the gear speed that is set as a gear speed to be established based on the vehicle speed.

4. A method for determining a transmission abnormal gear speed in an automatic shift apparatus that is to be mounted on a vehicle and includes a transmission that forms a plurality of gear speeds by engaging different combinations of two of a plurality of friction engagement elements, the method comprising:

setting by a processor, based on a vehicle speed, a minimum allowable gear speed as the gear speed at which a rotation speed of an input shaft of the transmission is equal to or lower than a predetermined rotation speed and which has a highest gear ratio among the plurality of gear speeds; and determining that the gear speed is abnormal responsive to the gear speed being the gear speed having a higher gear ratio than the set minimum allowable gear speed due to a change in the gear speed of the transmission, and not determining that the gear speed is abnormal responsive to the gear speed being the gear speed having a higher gear ratio than the set minimum allowable gear speed due to a change in the set minimum allowable gear speed, and determining that the gear speed is abnormal responsive to the gear speed becoming a gear speed having a higher gear ratio than the set minimum allowable gear speed, due to the change in the set minimum allowable gear speed, and the rotation speed of the input shaft of the transmission becoming higher than a second predetermined rotation speed determined as a rotation speed higher than the predetermined rotation speed.

* * * * *